US012318723B2

(12) United States Patent
Dexter

(10) Patent No.: US 12,318,723 B2
(45) Date of Patent: *Jun. 3, 2025

(54) FILTER FRAME WITH FOLDABLE SEALING FLAP

(71) Applicant: Baldwin Filters, Inc., Cleveland, OH (US)

(72) Inventor: Levi William Dexter, Elm Creek, NE (US)

(73) Assignee: Baldwin Filters, Inc., Cleveland, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 18/644,385

(22) Filed: Apr. 24, 2024

(65) Prior Publication Data
US 2024/0269591 A1 Aug. 15, 2024

Related U.S. Application Data

(62) Division of application No. 17/353,253, filed on Jun. 21, 2021, now Pat. No. 11,992,796.

(60) Provisional application No. 63/136,533, filed on Jan. 12, 2021, provisional application No. 62/705,647, filed on Jul. 9, 2020.

(51) Int. Cl.
B01D 46/00 (2022.01)
B01D 46/52 (2006.01)

(52) U.S. Cl.
CPC ..... B01D 46/0005 (2013.01); B01D 46/0001 (2013.01); B01D 46/0016 (2013.01); B01D 46/521 (2013.01); B01D 2265/04 (2013.01); B01D 2265/06 (2013.01)

(58) Field of Classification Search
CPC ............. B01D 46/521; B01D 46/0005; B01D 46/0001; B01D 46/0016; B01D 2265/04; B01D 2265/06
See application file for complete search history.

(56) References Cited

U.S. PATENT DOCUMENTS

| 3,712,033 A | 1/1973 | Gronholz |
| 3,815,754 A | 6/1974 | Rosenberg |
| 3,992,173 A | 11/1976 | Wharton et al. |
| 4,105,423 A | 8/1978 | Latakas et al. |
| 4,135,900 A | 1/1979 | Westlin et al. |

(Continued)

FOREIGN PATENT DOCUMENTS

| DE | 102009042588 A1 | 6/2010 |
| EP | 0995474 A2 | 4/2000 |

OTHER PUBLICATIONS

U.S. Appl. No. 17/353,253, filed Jun. 21, 2021.

Primary Examiner — Robert Clemente
(74) Attorney, Agent, or Firm — Reinhart Boerner Van Deuren P.C.

(57) ABSTRACT

Filter elements and methods of manufacturing filter elements are provided. Examples of filter elements include a media pack and a frame attached thereto. In one example, the frame includes a side panel that is or includes a foldable portion. The foldable portion is folded away from the media pack and an adhesive is located therebetween during assembly. In other examples, a media support member is provided that includes at least one side support panel that supports a side of the media pack. A portion of the side support member is positioned between adjacent pleat panels of the media pack.

14 Claims, 10 Drawing Sheets

(56) References Cited

U.S. PATENT DOCUMENTS

| | | | |
|---|---|---|---|
| 4,617,122 A * | 10/1986 | Kruse | B01D 46/10 |
| | | | 210/493.3 |
| 6,406,509 B1 | 6/2002 | Duffy | |
| 6,454,826 B2 | 9/2002 | Fath et al. | |
| 7,320,720 B2 | 1/2008 | Ticknor | |
| 7,691,165 B1 | 4/2010 | Hammes | |
| 8,382,874 B2 | 2/2013 | Greist et al. | |
| 9,724,635 B2 | 8/2017 | Merritt et al. | |
| 10,357,731 B2 | 7/2019 | Von Seggern et al. | |
| 11,992,796 B2 * | 5/2024 | Dexter | B01D 46/0005 |
| 2008/0236121 A1 | 10/2008 | Volkmer et al. | |
| 2010/0269467 A1 | 10/2010 | Crabtree et al. | |
| 2010/0269468 A1 | 10/2010 | Crabtree et al. | |
| 2012/0061311 A1 | 3/2012 | Reinhold | |
| 2014/0109534 A1 | 4/2014 | Rahmathullah et al. | |
| 2015/0265957 A1 | 9/2015 | Fox | |

* cited by examiner

FILTER FRAME WITH FOLDABLE SEALING FLAP

CROSS-REFERENCE TO RELATED PATENT APPLICATIONS

This Patent Application is a Divisional of U.S. patent application Ser. No. 17/353,253, filed Jun. 21, 2021, which is now pending, the entire teachings and disclosure each of which are incorporated herein by reference thereto. This Patent Application and U.S. patent application Ser. No. 17/353,253 claim the benefit of U.S. Provisional Patent Application No. 62/705,647, filed Jul. 9, 2020, the entire teachings and disclosure each of which are incorporated herein by reference thereto. This Patent Application and U.S. patent application Ser. No. 17/353,253 claim the benefit of U.S. Provisional Patent Application No. 63/136,533, filed Jan. 12, 2021, the entire teachings and disclosure each of which are incorporated herein by reference thereto.

FIELD OF THE INVENTION

This invention generally relates to filter elements for filtering fluids.

BACKGROUND OF THE INVENTION

Filter systems are used for filtering fluids to remove contaminants. The filter system often includes replaceable filter elements that are removable from the system that can be replaced when spent without having to replace the entire system.

The replaceable filter element often includes a block of filter media, often called a media pack and a seal for sealing the media pack within the system to prevent dirty fluid from bypassing the media pack. The seal is often operably secured to the media pack by a seal support frame. The seal support frame supports the seal so that a good seal can occur between the seal and the rest of the filter system (e.g. a filter housing).

The seal support frame is often mechanically interposed between the seal and the filter media of the media pack. Further, the seal support frame is often adhesively secured directly or indirectly to the media pack. The adhesive used to secure the seal support frame to the media pack often seals the seal support frame to the media pack.

In some systems, the seal support frame has side panels that extend along sides of the media pack. A reservoir is formed between the side panels and the adjacent outer surfaces of the media pack for receipt of a sealing adhesive to secure and seal the support frame to the media pack. The reservoir holds the adhesive as it cures post assembly.

Unfortunately, the requirement for the reservoir can reduce the volume of filter media that can be located within a given sized seal support frame.

Further yet, in some filter elements, media support structure such as wrappers are often placed around the media pack to support and provide rigidity to the media pack. Unfortunately, when the media support structure is interposed between the outer periphery of the media pack and the seal support frame, the adhesive used to secure the seal support frame to the media pack does not directly contact the filter media of the media pack in all locations. Instead, in some locations, the adhesive may have to flow around portions of the media support structure. This can lead to undesirable leak paths if the adhesive does not fully flow around the media support structure. This can also weaken the attachment of the adhesive to the filter media.

Examples of the application provide improvements over the current state of the art as it relates to filter elements for filtering fluid and particularly filter elements that include seal support frames and/or filter media support members, and more particularly filter elements that are generally rectangular in shape.

BRIEF SUMMARY OF THE INVENTION

Examples of the present application provide new and improved filter elements and methods of manufacturing filter elements. The filter elements may include an improved attachment of a seal support frame to the media pack. Filter elements may include an improved mounting of a media pack support member that surrounds portions of the media pack.

In an example, a filter element including a filter media pack, a media support member, a support frame and an adhesive is provided. The filter media pack has a plurality of pleat panels. Pairs of adjacent ones of the plurality of pleat panels are interconnected by a fold. The media support member has a first side support panel having a first portion interposed between first and second pleat panels of a first pair of adjacent pleat panels. The support frame is secured to the filter media pack. The adhesive secures the support frame to the filter media pack. The adhesive is interposed between the first pleat panel and the support frame with the adhesive directly contacting the support frame and directly contacting the first pleat panel.

In one example, the filter media pack has a first flow face, a second flow face opposed to the first flow face, and a first side extending between the first and second flow faces. The first side is formed, at least in part, by the first pleat panel. The first side support panel is positioned, at least in part, between the first and second flow faces and is adjacent the first side.

In one example, the first pleat panel extends less than an entire length between the first flow face and the second flow face such that the second pleat panel forms part of the first side of the filter media pack.

In one example, the first side support panel overlaps, at least in part, a portion of the second pleat panel that forms part of the first side of the filter media pack. The portion of the second pleat panel is positioned between the first pleat panel and the second flow face.

In one example, the filter media is formed from a first material and the first side support panel is formed from a second material. The second material being a rigid plastic that is non-porous. This prevents the adhesive from soaking through the support panel. The rigidity can help with potting and attachment to the filter media and/or attaching the frame.

In one example, an attachment mechanism is between at least one of the first and second pleat panels and the first side support panel.

In one example, the attachment mechanism is double-sided tape. Preferably, the double-sided tape secures the first pleat panel (e.g. the outer most of the first and second pleat panels) to the first side support panel during assembly. In another example, the attachment mechanism may be adhesive.

In one example, the media pack includes third and fourth pleat panels forming a second pair of adjacent pleat panels. The first pair of pleat panels is proximate a first side of the filter media pack and the second pair of pleat panels is proximate an opposed second side of the filter media pack.

The media pack includes opposed first and second flow faces. The first and second sides extend between the first and second flow faces. The media support member includes a second side support panel having a second portion interposed between third and fourth pleat panels. The second side support panel is adjacent the second side. The adhesive is additionally interposed between the third pleat panel and the support frame with the adhesive directly contacting the support frame and directly contacting the third pleat panel.

In one example, the media support member includes a flow face support panel extending across the second flow face of the media pack between the first and second sides of the media pack. The flow face support panel is connected to the first and second side support panels.

In one example, the flow face support panel and first and second side support panels are formed from a continuous piece of material. For example, the components may be formed from a single molded component.

In one example, a first web of material is positioned between and connects the flow face support panel to the first side support panel. A second web of material is positioned between and connects the flow face support panel to the second side support panel.

In one example, the first web of material has a thickness that is less than a thickness of the flow face support panel proximate the first web and less than a thickness of the first side support panel proximate the first web. The second web of material has a thickness that is less than a thickness of the flow face support panel proximate the second web and less than a thickness of the second side support panel proximate the second web.

These differences in thickness can result in grooves formed between the adjacent panels proximate the webs.

In another example, a filter element including a media pack, a frame and a mass of adhesive is provided. The frame includes at least one side panel extending along a side of the media pack. The side panel has a foldable portion enabling the side panel to be folded relative to the media pack. The mass of adhesive is positioned between the foldable portion of the side panel and the media pack and fixes the frame to the media pack.

In one example, the media pack comprises an elongated rectangular structure with opposing side surfaces. The frame includes a pair of side panels. Each side panel extends along a respective side surface of the media pack. Each side panel has a foldable portion, with a mass of adhesive between the foldable portion of each side panel and the respective side surface of the media pack.

In one example, the side panel includes a fixed first portion adjacent a base of the frame and a hinge between the first portion and the foldable portion.

The base may form an annular body that defines a flow opening through the frame. The side panel projects from a side of the annular body. The side panel may project further away from the base along one side of the media pack. The foldable portion, in one example, extends along only one side of the media pack and does not extend entirely around the media pack.

In one example, the first portion and the foldable portion are formed from a continuous piece of material and the hinge is a living hinge formed from material connecting the first portion to the foldable portion.

In one example, the hinge has a reduced thickness as compared to a thickness of the first portion proximate the foldable portion and a thickness of the foldable portion proximate the first portion.

In one example, a first groove is formed between the first portion and the foldable portion at the hinge.

In one example, the first portion and foldable portion each have an inner side that faces the media pack. The first groove is formed between the inner side of the first portion and the outer side of the foldable portion.

In one example, a second groove is formed between the first portion and the foldable portion at the hinge.

In one example, the first portion and foldable portion each have an outer side that faces away from the media pack, the second groove is formed between the outer side of the first portion and the outer side of the foldable portion.

In one example, the first portion and foldable portion each have an inner side that faces the media pack. A first groove is formed between the inner side of the first portion and the inner side of the foldable portion at the hinge. The first groove has a first depth. The first portion and foldable portion each have an outer side that faces away from the media pack. A second groove is formed between the outer side of the first portion and the outer side of the foldable portion at the hinge. The second groove has a second depth that is different than the first depth.

In one example, an end cap is secured to an end of the media pack. The end cap has a sidewall extending over the side of the media pack. The foldable portion is located between the side of the media pack and the sidewall of the end cap with the foldable portion being folded towards the media pack.

In another example, a method of assembling a filter element is provided. The filter element includes a frame and a media pack. The frame includes at least one side flap extending along a side of the media pack. The method includes folding a foldable portion of the at least one side flap away from the media pack. The method includes applying a bead of adhesive between the foldable portion of the side flap and the media pack. The method includes folding the foldable portion of the side flap back towards the media pack thereby capturing the adhesive between the side flap and the media pack. The method includes curing the adhesive.

In another example, a method of assembling a filter element including a frame, a media support member and a media pack is provided. The frame extends along a side of the media pack and the media support member includes at least one side panel positioned adjacent the side of the media pack. The method including folding a portion of the media pack to form first and second pleat panels. The method including positioning the side panel of the media support member adjacent the side of the media pack such that a portion of the side panel is positioned between the first and second pleat panels. The method including positioning the media pack within the frame with frame extending over the first pleat panel such that the first pleat panel is located between the frame and the side panel of the media support member. The method including applying a bead of adhesive between the frame and the first pleat panel of the media pack such that the adhesive directly contacts an inner surface of frame and an outer surface of the first pleat panel.

In one example, the frame includes a side panel that extends from an annular body portion of the frame. The side panel extends over the side of the media pack. The adhesive is directly engaged with an inner surface of the side panel. As such, no intervening structure, in some examples, exists between the inner surface of the side panel of the frame and the media pack where the adhesive is located.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
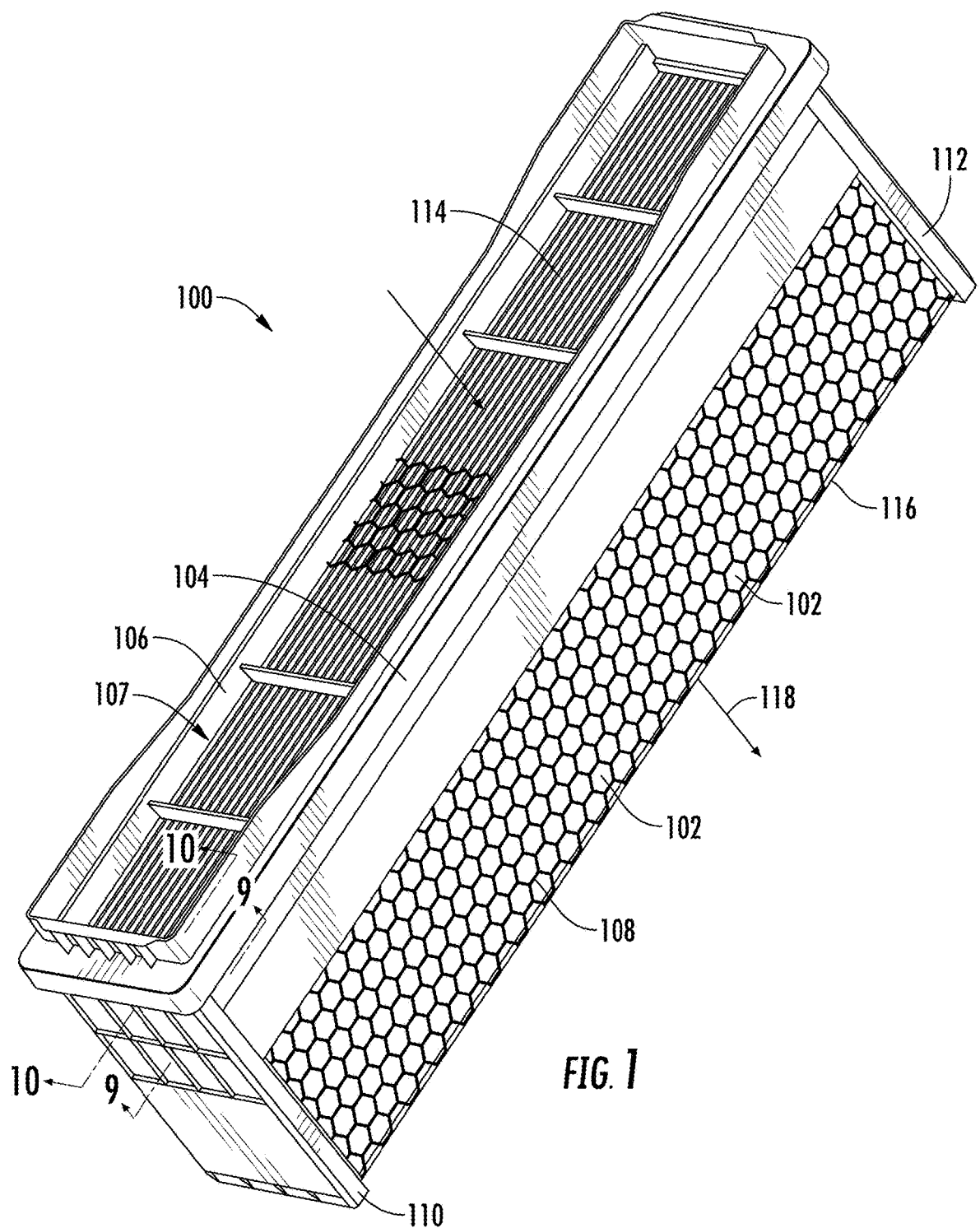
FIG. 1 is a perspective illustration of an example of a filter element according to the teachings of the present disclosure.

FIG. 1 illustrates an example of a filter element 100 according to the instant disclosure. The filter element 100 includes a media pack 102, a housing seal 104, a seal support frame 106, a media support member 108, and a pair of end caps 110, 112. The filter element 100 finds particular use in filtering impurities from air, but can be used to filter other fluids as well.

Figure 2:
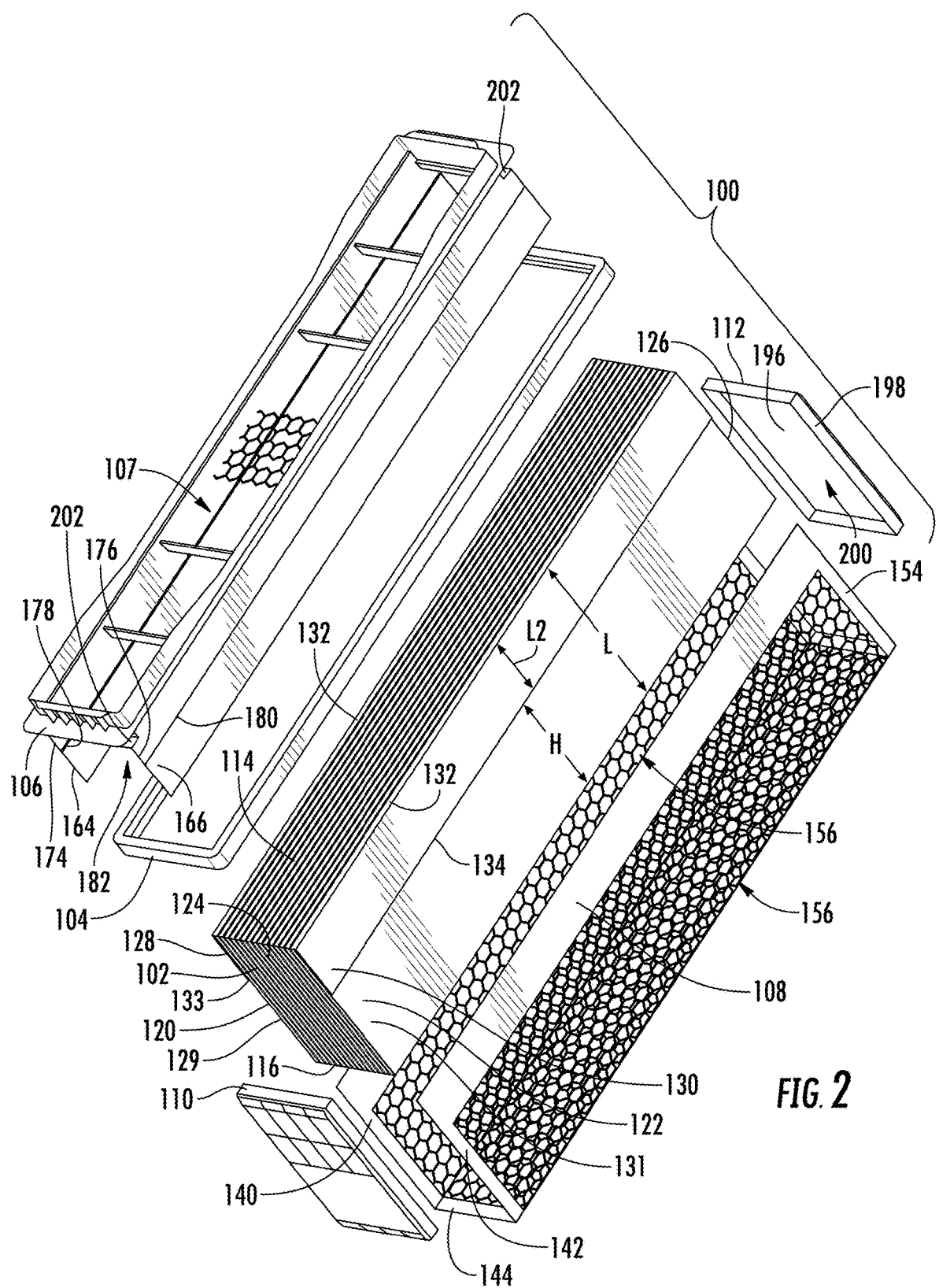
FIG. 2 is an exploded illustration of the filter element of FIG. 1.

FIG. 2 illustrates the filter element 100 in exploded form.

The media pack 102 is generally a rectangular media pack and can take the form of pleated media, fluted media, or a simple block of media.

The media pack 102 includes opposed first and second flow faces 114, 116 through which the fluid to be filtered generally passes. In FIG. 1, arrow 118 represents dirty fluid entering the filter element 100 through first flow face 114 and clean fluid exiting through second flow face 116 after the fluid has passed through the filter media of the media pack 102. In other examples, the air flow could be opposite that of arrow 118.

With reference to FIG. 2, the media pack has opposed first and second sides 120, 122, that extend between the first and second flow faces 114, 116. Additionally, the media pack 102 includes opposed first and second ends 124, 126 that extend between the first and second flow faces 114, 116 and between the first and second sides 120, 122.

While substantially any type of filter media pack may be used in conjunction with individual features of the present disclosure, in the illustrated example, the filter media pack 102 is pleated filter media. The media pack 102 is thus formed from a continuous sheet of filter media that has plurality of alternately oriented folds that form a plurality of pleat panels extending between the pleat folds. In some examples, such as in the illustrated example, the pleat folds would form the first and second flow faces 114, 116. Thus, the typical pleat panel would extend the entire length L between the first and second flow faces 114, 116.

However, in this example, the two outer most pleat panels 128, 130 (e.g. the first pleat panel 128 and the last pleat panel 130) extend less than the entire length L and have second length L2. Because of this, in this example, the second pleat panel 129 and second to last pleat panel 131 are only partially overlapped by the first and second pleat panels 128, 130, respectively. Thus, each of the second pleat panel 129 and second to last pleat panel 131 includes a region extending between the second flow face 116 and an edge 133, 134 of the corresponding first and last pleat panels 128, 130 that is exposed, at least prior to attachment of the media support member 108 and end caps 110, 112. In this embodiment, the height H of the exposed regions is greater than the length L2 of the first and last pleat panels 128, 130.

The pleat folds 132, only two of which are illustrated in the present figures for simplicity, extend longitudinally between the first and second ends 124, 126 of the media pack 102.

Figure 3:
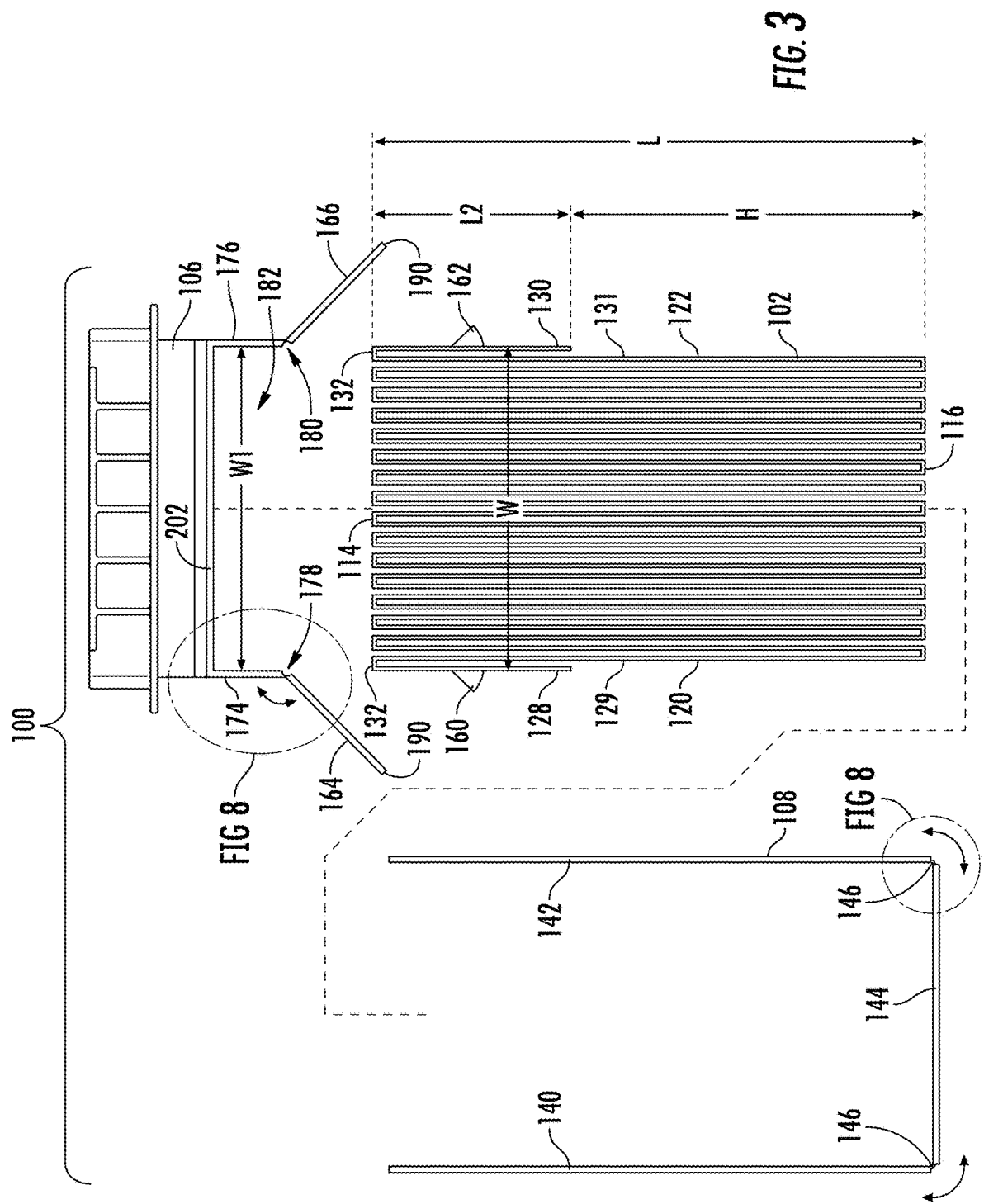
FIG. 3 is an end view, exploded illustration of the filter element of FIG. 1 during assembly.

With reference to FIGS. 1-3, the media support member 108 extends around the first and second sides 120, 122 and the second flow face 116 to provide additional structural support to the media pack 102. As such, the media support member 108 includes first and second side support panels 140, 142 that overlap, at least in part, the first and second sides 120, 122, respectively, and a flow face support panel 144 that extends across the second flow face 116.

In an example, the first and second side support panels 140, 142 and flow face support panel 144 are all formed from a continuous piece of material. As such, the entire media support member 108 may be formed from a single continuous piece of material, such as by way of molding as a continuous piece of material, machining from a single piece of material or if the media support member is formed from a fabric, providing a single piece of fabric that forms all three portions.

Figure 4:
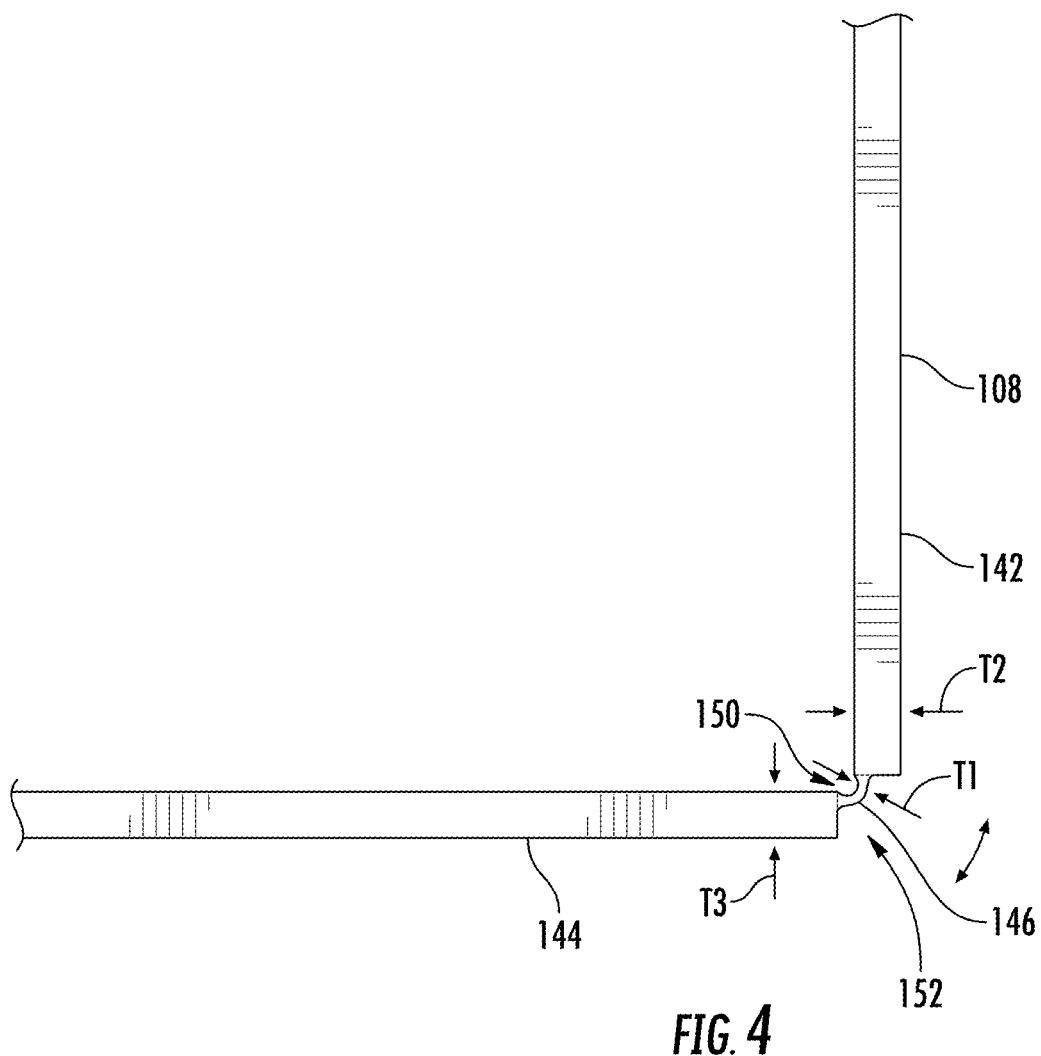
FIG. 4 is an enlarged, partial illustration of the media support member of the filter element of FIG. 1.

With reference to FIGS. 3 and 4, the side support panels 140, 142 are connected to the flow face support panel 144. In the illustrated embodiment, connection is made by hinges 146 in the form of unitary webs of material interposed between the interconnected components. The webs forming hinges 146 have a thickness T1 that is less than the thicknesses T2, T3 of the adjacent side support panels 140, 142 and flow face support panel 144 proximate the corresponding hinges 146 (see e.g FIG. 4).

In this example, the hinges 146 form first and second grooves 150, 152 due to the reduced thickness T1 as compared to thicknesses T2, T3. The reduced thickness T1 allows for the media support member 108 to be formed in a flat orientation and then wrapped around the media pack 102 and particularly around first and second sides 120, 122 and second flow face 116 during assembly with the panels of the media support member 108 pivoting relative to one another via hinges 146. For example, the media support member 108 maybe preformed component that is secured to the media pack 102 after formation of the media pack 102.

However, in some examples, the media pack support member 108 could be formed directly to the media pack 102.

An adhesive may be applied to directly secure the media support member 108 to the filter media of the media pack 102.

Typically, the media support member 108 will be formed from plastic materials such as polypropylene, nylon, corrugated plastic sheet, plastic mesh, possibly cardboard. In some embodiments, the media support member 108 may be formed as a continuous molded piece of material.

With reference to FIG. 2, the media support member 108 has large apertures 156 formed there such that fluid flow through the sides 120, 122 and second flow face 116 is not significantly inhibited.

The media support member 108 includes an imperforate border 154 that extends along peripheral edges of the media support member 108.

The imperforate border can assist in sealing the various components of the filter element 100.

Figure 5:
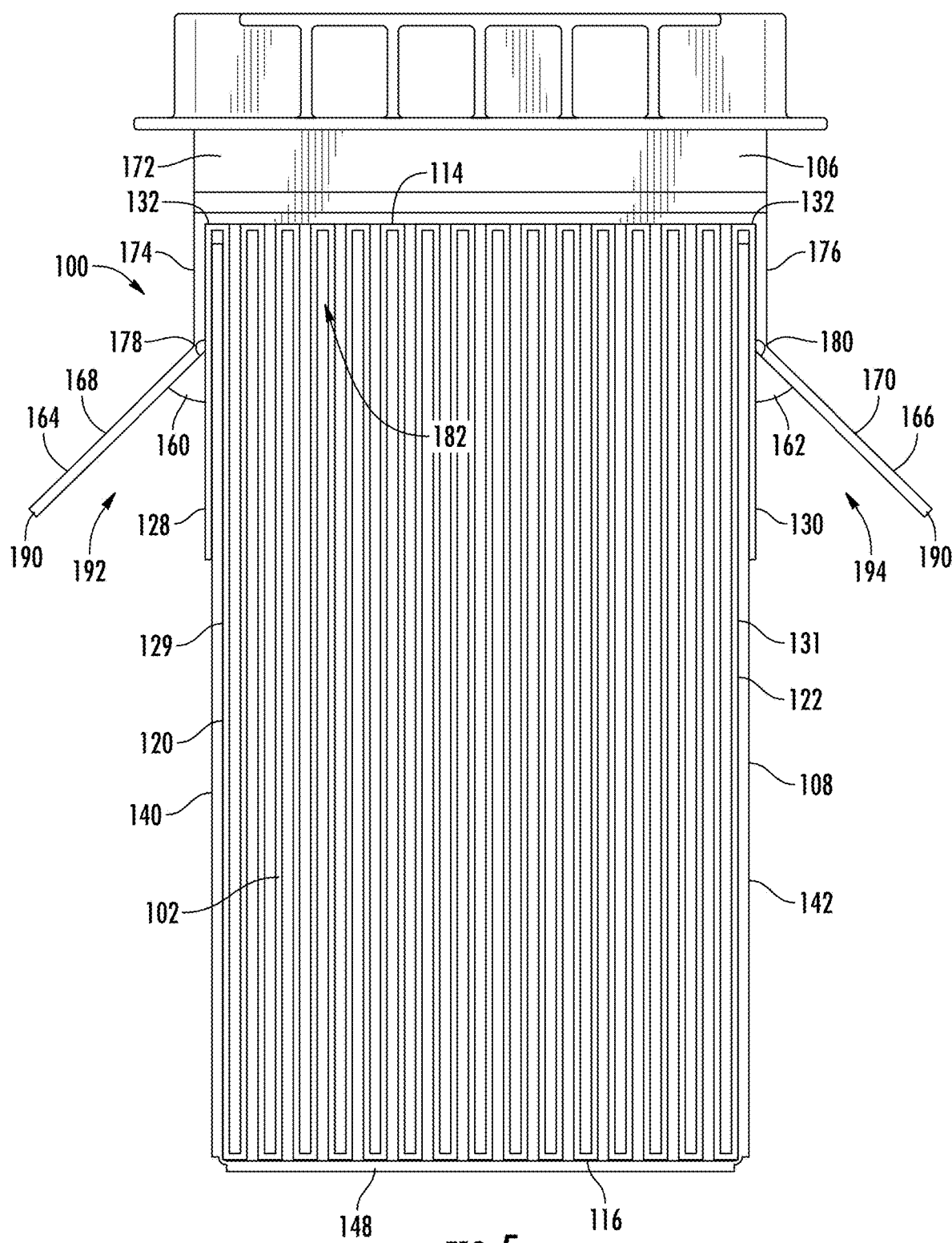
FIG. 5 is an end view of the filter element of FIG. 1, prior to folding the foldable portions of the side panels of the seal support frame and installing the end caps.

With reference to FIG. 5, a portion of the first side support panel 140 is interposed between the first and second pleat panels 128, 129 and a portion of the second side support panel 142 is interposed between the last and second to last pleat panels 130, 131.

More particularly, the portion of the sheet of filter media forming the media pack 102 that forms the first and last pleat panels 128, 130 is folded over the corresponding one of the first and second side support panels 140, 142. The actual formation of these folds may occur before or after locating the media pack 102 within the media support member 108.

In this example, as noted above, the first and last pleat panels 128, 130 are shorter than the second and second to last pleat panels 129, 131, a portion of each of the first and second side support panels 140, 142 is not covered by any filter media of the media pack 102. Instead, a portion of these side support panels 140, 142 proximate each of the first and second sides 120, 122 of the media pack 102 is fully exposed.

The arrangement illustrated above of having the first and last pleat panels 128, 130 overlapping the media support member 108 facilitates improved sealing between the media pack and seal support frame 106. This prevents fluid from passing through the seal support frame 106 and particularly flow opening 107 thereof (see FIG. 1), from bypassing the filter media of media pack 102.

Frame 106 may be formed from rigid plastic such as polypropylene and nylon.

More particularly, a mass of adhesive in the form of beads of adhesive 160, 162 is located between the media pack 102 and the seal support frame 106 (see FIG. 5). The adhesive 160, 162 directly engages the outer surface of pleat panels 128, 130 and the seal support frame 106. This opposed to a situation where the entire first and second sides 120, 122 of the media pack 102 were covered by the media support member 108. In that situation, the media support member 108 could inhibit a complete engagement of the adhesive with the filter media of the media pack 102 and provide possible leak paths. Instead, in this arrangement, the adhesive 160, 162 need not flow around portions of the media support member 108 nor does an adhesive between the media support member 108 and the outer surfaces of the media pack need to perfectly seal the media support member 108 to the media pack to prevent undesirable leak paths between the seal support frame and the media pack 102.

As illustrated in FIG. 1, the seal support frame 106 supports housing seal 104. In this example, the seal 104 is an axial seal that is compressed against a radially extending flange of the seal support frame 106. The seal 104 may be mold-in place or a preformed seal. Further, while an axial seal is illustrated, other examples can use a radial seal.

Thus, the seal support frame 106 needs to be sealed to the media pack 102 to prevent undesirably dirty fluid bypass around the media pack 102.

One location with this sealing occurs is along the first and second sides 120, 122 of the media pack. As noted above, adhesive 160, 162 provides this sealing between the support frame 106 and the media pack 102 at these locations.

The seal support frame 106 is configured to improve the assembly of the filter element and particularly mounting the seal support frame 106 to the media pack 102. The seal support frame 106 is also configured to allow for increased amount of filter media in the media pack 102 as compared to the prior arrangements described above.

Figure 6:
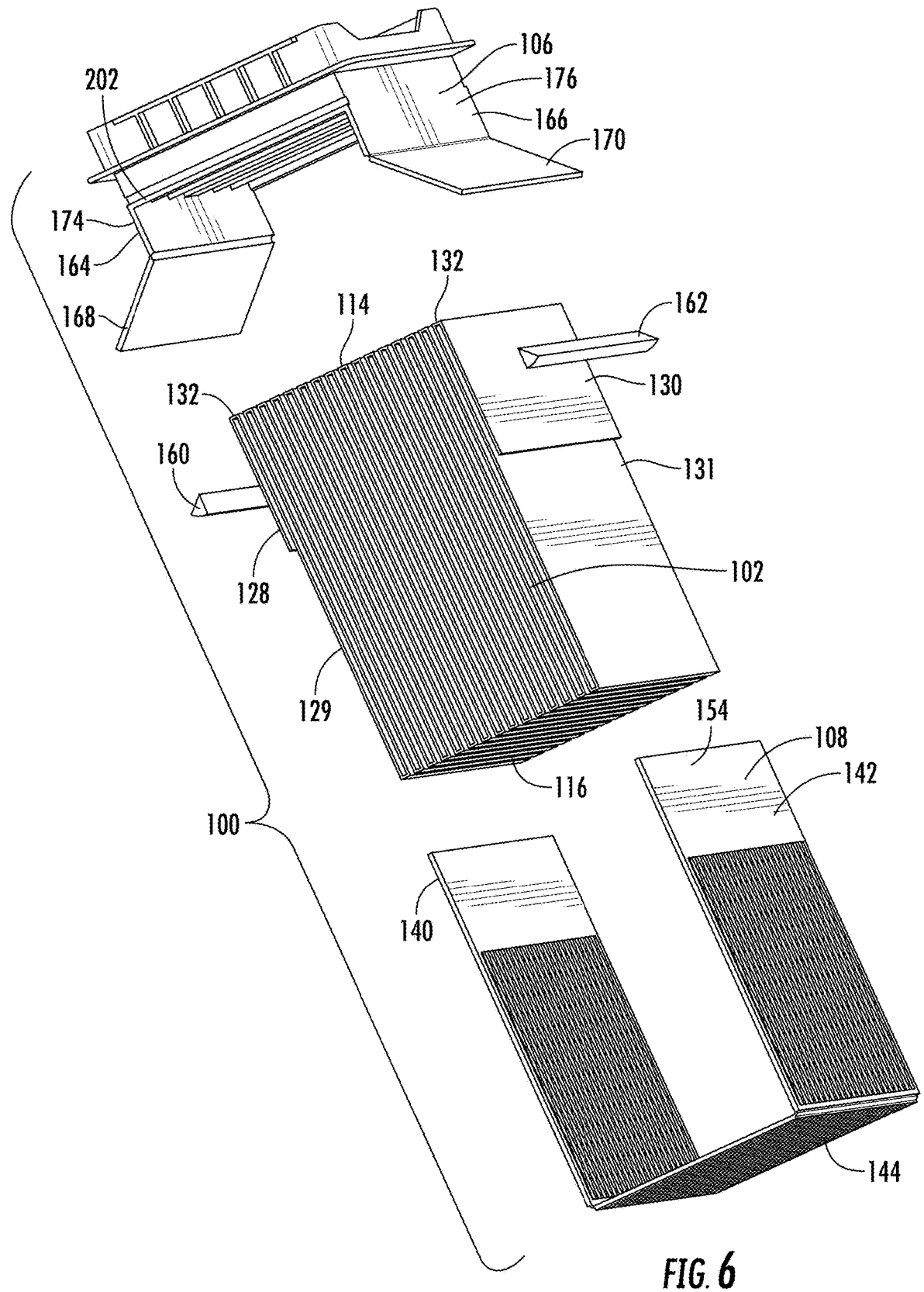
FIG. 6 is a further exploded and enlarged illustration of the filter element of FIG. 1 without the end caps.
Figure 7:
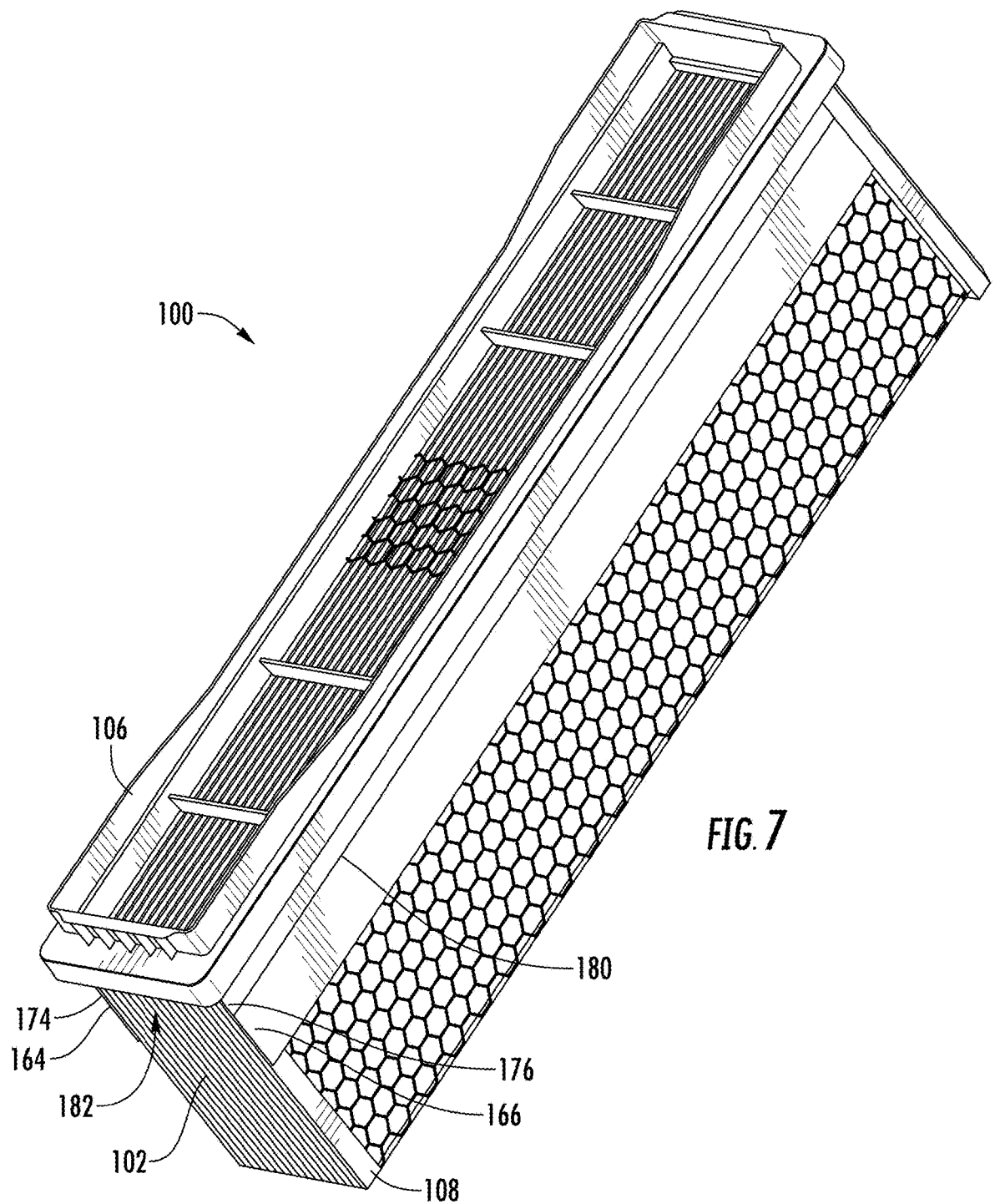
FIG. 7 is a perspective illustration of the filter element of FIG. 1 with one of the end caps removed.

In the illustrated example and with reference to FIGS. 5 and 6, the seal support frame 106 includes opposed side panels 164, 166 that extend along the first and second sides 120, 122 of the media pack 102, respectively. These side panels 164, 166 are adhesively secured to the first and second sides 120, 122 of the media pack 102 to prevent fluid bypass between the seal support frame 106 and the media pack 102, at least in part.

The seal support frame 106 will typically be formed from molded plastic.

Figure 8:
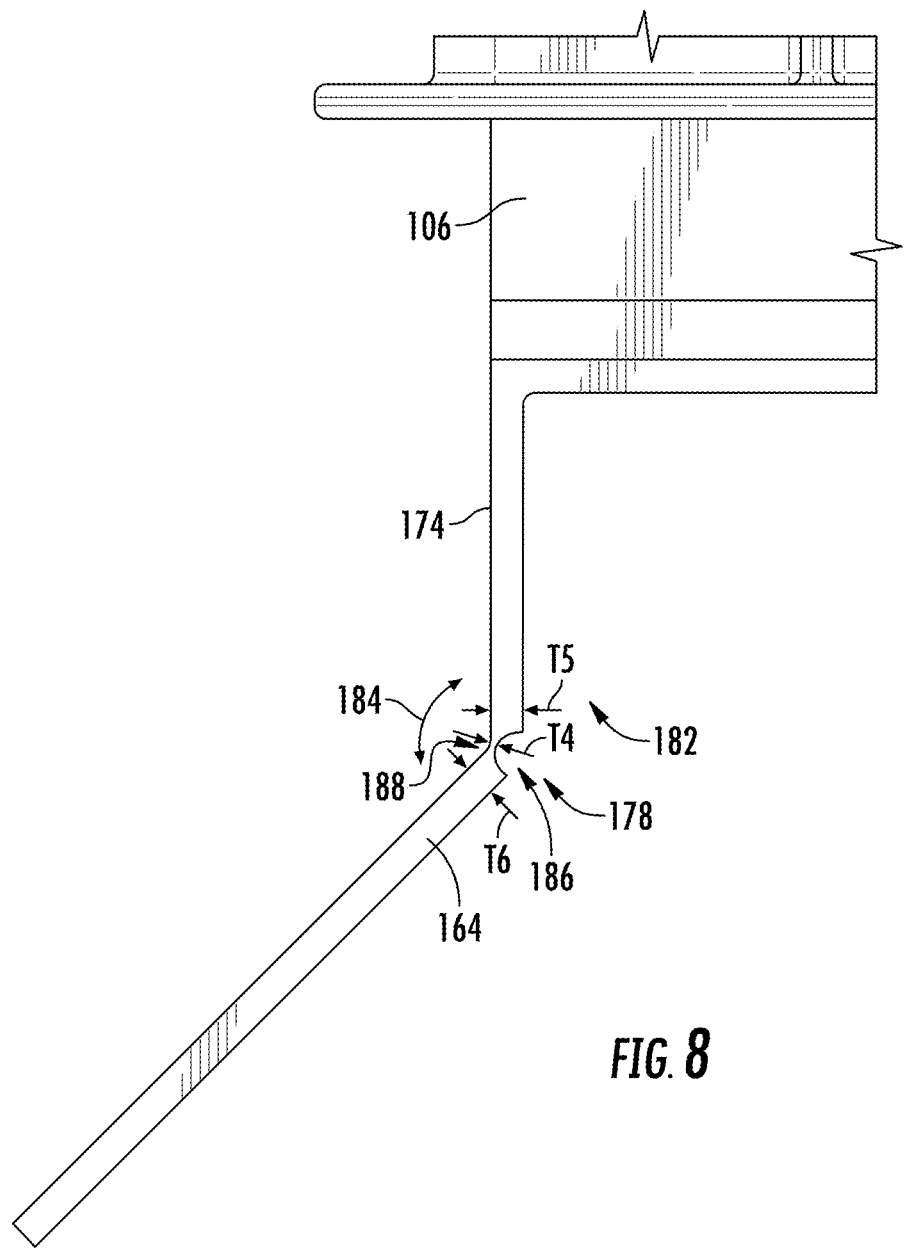
FIG. 8 is an enlarged, partial illustration of the side panels of the seal support frame illustrating the foldable portion folded outward such as during assembly of the filter element of FIG. 1.

In this example, the side panels 164, 166 include foldable portions 168, 170, respectively that facilitate in assembly and increased media. The foldable portions 168, 170 are foldable relative to the media pack 102 as well as to fixed portions 174, 176 of a base 172 of the seal support frame 106 (see e.g. arrow 184 in FIG. 8).

In the illustrated example, the fixed portions 174, 176 extend along a portion of the first and second sides, 120, 122 respectively between the first and second flow faces 114, 116, such that a portion of the media pack 102 is received within the cavity 182 formed between the fixed portions 174, 176 of the seal support frame.

The ability to fold the foldable portions 168, 170 is provided by hinges 178, 180. The hinges 178, 180 are provided by webs of material that have a reduced thickness T4 as compared to the thicknesses T5, T6 of the adjacent portions of the fixed portions 174, 176 and foldable portions 168, 170. These webs provide living hinges that allow the foldable portions 168, 170 to pivot relative to fixed portions 174, 176.

The difference in thicknesses defines grooves 186, 188 between the inner and outer surfaces of the fixed portions 174, 176 and inner and outer surfaces of foldable portions 164, 166.

In this example, the base 172, foldable portions 168, 170 and fixed portions 174, 176 of the seal support frame 106 are formed as a single continuous piece of material, such as machined from a single piece of material or formed by molding the components as a one-piece component.

During assembly, the foldable portions 168, 170 are folded outward, such as illustrated in FIGS. 3 and 5. This provides several benefits. First, this creates a wider width mouth between the distal ends 190 of the foldable portions 168, 170 for inserting the media pack 102 between the side panels 164, 166. This allows the width W of the media pack 102 to be substantially equal to if not slightly larger than the width W1 between the fixed portions 174, 176 of the side panels 164, 166. This allows more media to be inserted into a same width W1 seal support frame.

Additionally, because the seal support frame 106 is adhesively secured to the media pack 102 by an adhesive, the foldable portions 168, 170 in the outward folded orientation defines reservoirs 192, 194 (see e.g. FIG. 5) between the side panels 164, 166 for receipt of masses of adhesive 160, 162 during assembly.

Once the adhesive 164, 166 has been dispensed in the reservoirs 192, 194, the foldable portions 168, 170 can be folded towards the media pack 102. Typically, this will compress the masses of adhesive 164, 166 and cause the adhesive to spread along the sides 120, 122 of media pack 102 and particularly along the outer surfaces of first and last pleat panels 128, 130. This provides a strong attachment as well as strong seal between the seal support frame 106 and the media of the media pack 102.

Unlike prior designs, no reservoir between a fixed side panel and the filter media of the media pack is needed, thus, the overall amount of media used in a similar sized seal support frame can be used.

With reference to FIGS. 1 and 2, end caps 110, 112 are attached to the ends 124, 126 of the media pack 102. The end caps 110, 112 in the example have a main wall portion 196 and an annular wall portion 198 extending from the main wall portion 196 to define a well 200. An adhesive is located within the wells 200. When the ends 124, 126 of the media pack are inserted into the well, the adhesive seals the ends 124, 126 of the media pack 102.

Figure 9:
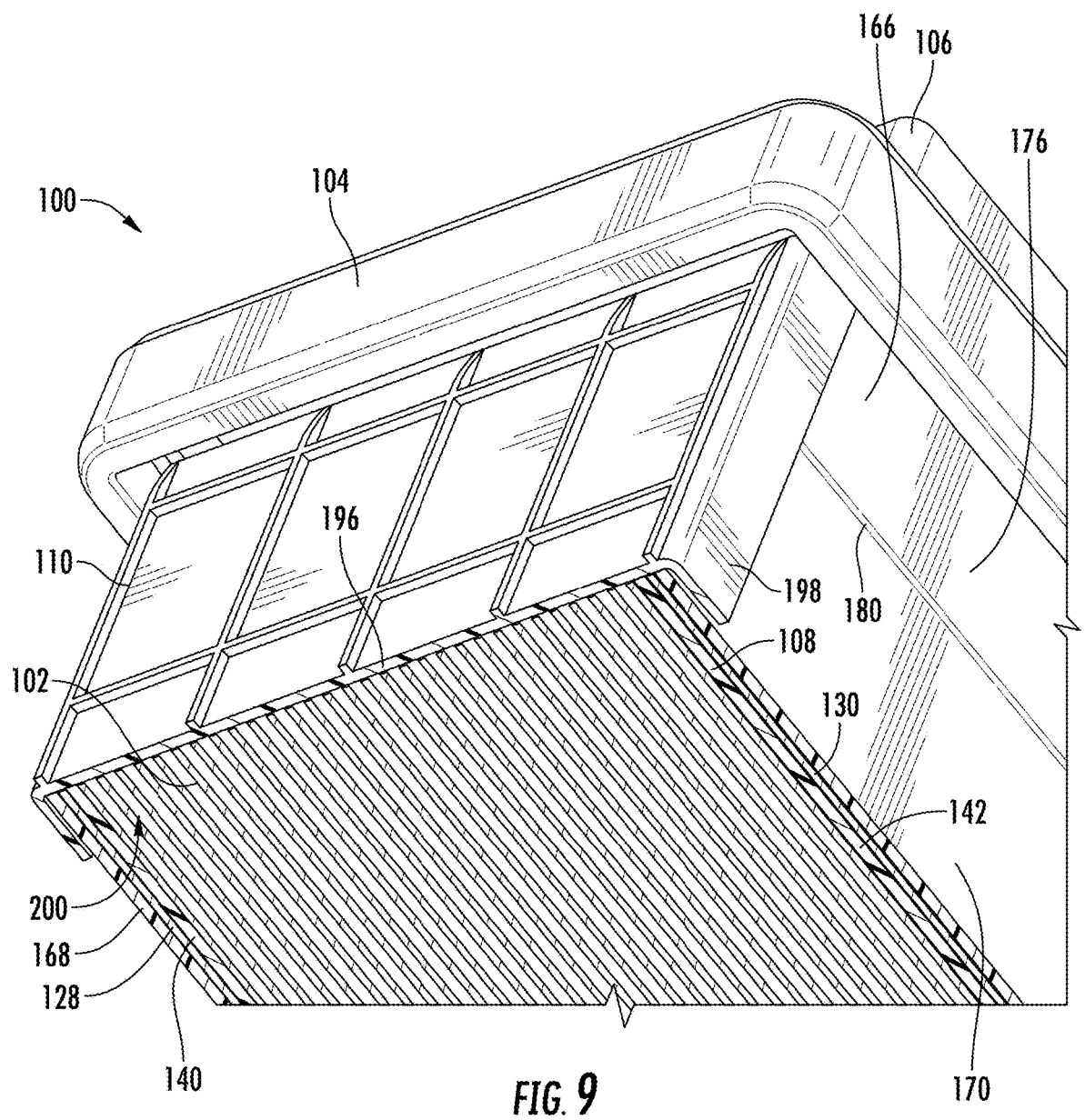
FIG. 9 is a cross-sectional illustration of the filter element of FIG. 1 taken about line 9-9 in FIG. 1.

FIG. 9 is a cross-sectional illustration illustrating the end cap 110 secured to the media pack 102. FIG. 9 illustrates that the ends of the side panels 164, 166 are received in the well 200 of the end cap.

Figure 10:
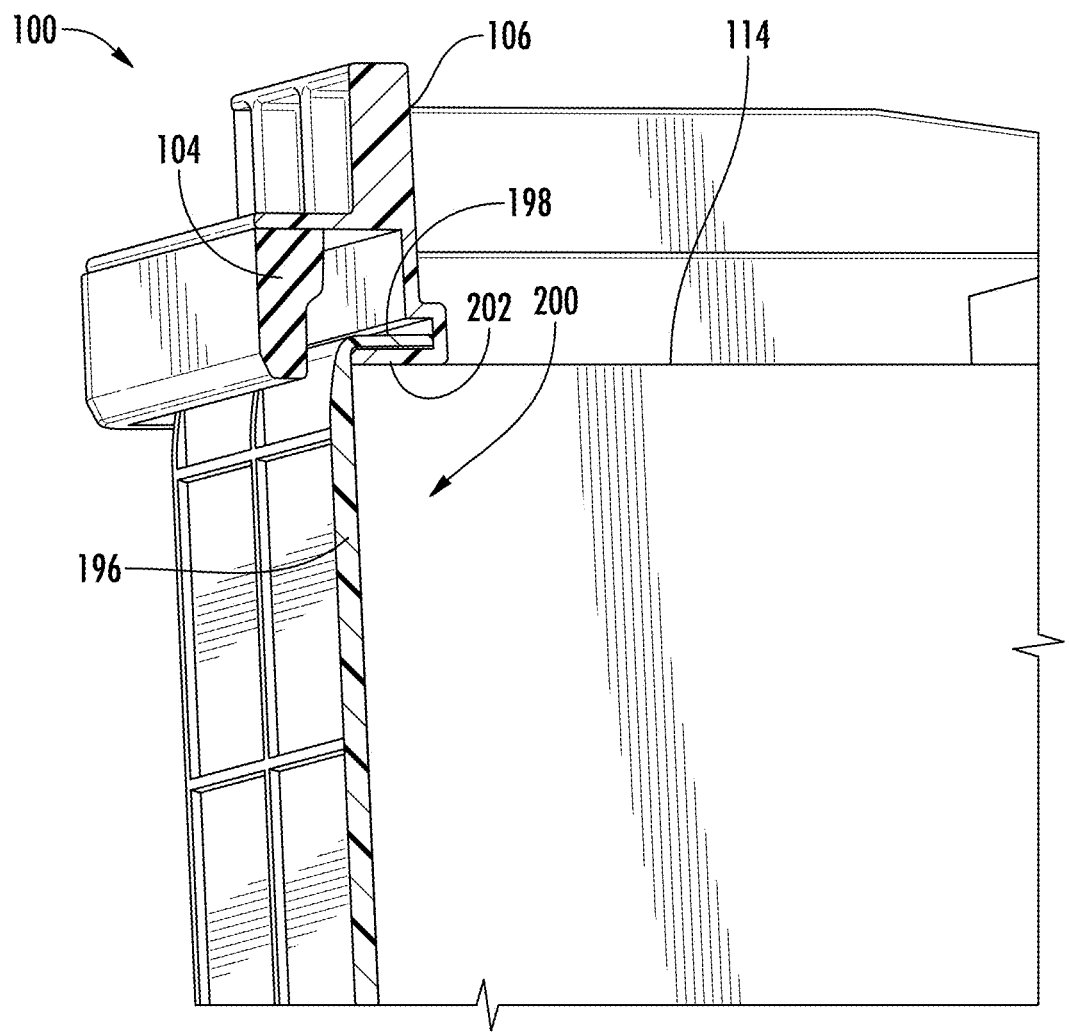
FIG. 10 is a cross-sectional illustration of the filter element of FIG. 1 taken about line 10-10 in FIG. 1.

With reference to FIG. 10, the seal support frame 106 includes a connecting wall portion 202 that extends between the side panels 164, 166 proximate the ends thereof. The connecting wall portion 202 extends across first flow face 114. Connecting wall portion 202 is secured within well 200. Thus, annular wall portion 198 extends around the media pack 102 and a portion of the seal support frame 106.

During assembly, the end caps 110, 112 can help secure the foldable portions 168, 170 in their proper orientation adjacent the sides of the media pack 102 as they cure. When assembled, the foldable portions 168, 170 are folded towards the media pack 102 and the ends of the foldable portions 168, 170 are located between the annular wall portion 168 and the media pack 102 within the well 200.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter element comprising:
    a filter media pack having a plurality of pleat panels, pairs of adjacent ones of the plurality of pleat panels being interconnected by a fold;
    a media support member having a first side support panel having a first portion interposed between first and second pleat panels of a first pair of adjacent pleat panels;
    a support frame secured to the filter media pack; and
    an adhesive securing the support frame to the filter media pack, the adhesive being interposed between the first pleat panel and the support frame with the adhesive directly contacting the support frame and directly contacting the first pleat panel.

2. The filter element of claim 1, wherein the filter media pack has a first flow face, a second flow face opposed to the first flow face, and a first side extending between the first and second flow faces, the first side is formed, at least in part, by the first pleat panel, the first side support panel positioned, at least in part, between the first and second flow faces and being adjacent the first side.

3. The filter element of claim 2, wherein the first pleat panel extends less than an entire length between the first flow face and the second flow face such that the second pleat panel forms part of the first side of the filter media pack.

4. The filter element of claim 3, wherein the first side support panel overlaps, at least in part, a portion of the second pleat panel that forms part of the first side of the filter media pack, the portion being positioned between the first pleat panel and the second flow face.

5. The filter element of claim 1, wherein the filter media is formed from a first material and the first side support panel is formed from a second material, the second material being plastic or cardboard.

6. The filter element of claim 1, further comprising an attachment mechanism between at least one of the first and second pleat panels and the first side support panel.

7. The filter element of claim 6, wherein the attachment mechanism is double-sided tape.

8. The filter element of claim 1, wherein:
    the media pack includes third and fourth pleat panels forming a second pair of adjacent pleat panels, the first pair of pleat panels being proximate a first side of the filter media pack and the second pair of pleat panels being proximate an opposed second side of the filter media pack;

the media pack includes opposed first and second flow faces, the first and second sides extending between the first and second flow faces;

the media support member includes a second side support panel having a second portion interposed between third and fourth pleat panels, the second side support panel adjacent the second side;

the adhesive being interposed between the third pleat panel and the support frame with the adhesive directly contacting the support frame and directly contacting the third pleat panel.

9. The filter element of claim 8, wherein:

the media support member includes a flow face support panel extending across the second flow face of the media pack between the first and second sides of the media pack; and the flow face support panel is connected to the first and second side support panels.

10. The filter element of claim 9, wherein the flow face support panel and first and second side support panels are formed from a continuous piece of material.

11. The filter element of claim 10, wherein:

a first web of material is positioned between and connects the flow face support panel to the first side support panel; and a second web of material is positioned between and connects the flow face support panel to the second side support panel.

12. The filter element of claim 11, wherein:

the first web of material has a thickness that is less than a thickness of the flow face support panel proximate the first web and less than a thickness of the first side support panel proximate the first web; and the second web of material has a thickness that is less than a thickness of the flow face support panel proximate the second web and less than a thickness of the second side support panel proximate the second web.

13. A method of assembling a filter element including a frame, a media support member and a media pack, wherein the frame extends along a side of the media pack and the media support member includes at least one side panel positioned adjacent the side of the media pack, comprising the steps of:

i. Folding a portion of the media pack to form first and second pleat panels;

ii. Positioning the side panel of the media support member adjacent the side of the media pack such that a portion of the side panel is positioned between the first and second pleat panels;

iii. positioning the media pack within the frame with frame extending over the first pleat panel such that the first pleat panel is located between the frame and the side panel of the media support member; and iv. applying a bead of adhesive between the frame and the first pleat panel of the media pack such that the adhesive directly contacts an inner surface of frame and an outer surface of the first pleat panel.

14. The method of claim 13, wherein the frame includes a side panel that extends from an annular body portion of the frame, the side panel extends over the side of the media pack, the adhesive is directly engaged with an inner surface of the side panel.

* * * * *